(12) United States Patent
Zabala

(10) Patent No.: US 9,741,053 B2
(45) Date of Patent: Aug. 22, 2017

(54) SYSTEM AND METHOD FOR PROMOTING MEDIA IN AN ONLINE DISTRIBUTION PLATFORM

(75) Inventor: Andrea Zabala, Cordoba (AR)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 13/996,024

(22) PCT Filed: Dec. 20, 2011

(86) PCT No.: PCT/US2011/066062
§ 371 (c)(1),
(2), (4) Date: Apr. 9, 2014

(87) PCT Pub. No.: WO2013/095365
PCT Pub. Date: Jun. 27, 2013

(65) Prior Publication Data
US 2014/0297408 A1    Oct. 2, 2014

(51) Int. Cl.
*A63F 9/24*    (2006.01)
*G06Q 30/02*    (2012.01)

(52) U.S. Cl.
CPC ..... *G06Q 30/0255* (2013.01); *G06Q 30/0209* (2013.01)

(58) Field of Classification Search
CPC .... A63F 2300/407; A63F 13/69; A63F 13/23; A63F 13/79; A63F 2300/552; G06Q 30/0255
See application file for complete search history.

(56) References Cited

U.S. PATENT DOCUMENTS

2003/0181242 A1* 9/2003 Lee .................. A63F 13/12
463/42
2005/0055309 A1* 3/2005 Williams ............... G06Q 30/02
705/40
(Continued)

FOREIGN PATENT DOCUMENTS

CN    101753439 A    6/2010
CN    102203815 A    9/2011
(Continued)

OTHER PUBLICATIONS

International Preliminary Report on Patentability and Written Opinion received for PCT Patent Application No. PCT/US2011/066062, mailed on Jul. 3, 2014, 8 pages.
International Search Report and Written Opinion received for PCT Patent Application No. PCT/US2011/066062, mailed on Jan. 20, 2012, 11 Pages.
(Continued)

*Primary Examiner* — Steve Rowland
(74) *Attorney, Agent, or Firm* — Grossman, Tucker, Perreault & Pfleger, PLLC

(57) ABSTRACT

A system and method for promoting media in an online distribution platform includes accessing one of a plurality of gaming applications provided on an online distribution platform with a client device over a network, wherein the content of each of the plurality of gaming applications includes metadata corresponding to media provided by the online distribution platform. The system and method further includes displaying information related to the media being promoted on during the gaming application gameplay and allowing a user to purchase and download and/or stream the media being promoted.

16 Claims, 4 Drawing Sheets

(56) References Cited

U.S. PATENT DOCUMENTS

| | | | |
|---|---|---|---|
| 2006/0080702 A1* | 4/2006 | Diez | A63F 13/12 |
| | | | 725/30 |
| 2006/0212401 A1 | 9/2006 | Ameerally et al. | |
| 2007/0296718 A1 | 12/2007 | Tzruya et al. | |
| 2008/0045338 A1 | 2/2008 | Walker et al. | |
| 2009/0005174 A1 | 1/2009 | Joo et al. | |
| 2009/0099928 A1 | 4/2009 | Vasile | |
| 2009/0276333 A1 | 11/2009 | Cortes et al. | |
| 2009/0286333 A1 | 11/2009 | Kozasa et al. | |
| 2010/0011354 A1* | 1/2010 | Gharabally | G06Q 30/06 |
| | | | 717/178 |
| 2010/0016082 A1 | 1/2010 | Prochnow | |
| 2010/0037235 A1* | 2/2010 | Larimore | G06F 9/455 |
| | | | 719/312 |
| 2011/0010759 A1 | 1/2011 | Adler | |
| 2011/0184805 A1 | 7/2011 | Margalit et al. | |
| 2011/0218044 A1 | 9/2011 | Joshi et al. | |
| 2012/0290583 A1* | 11/2012 | Mahaniok | G06F 8/60 |
| | | | 707/741 |
| 2013/0095910 A1* | 4/2013 | Chu | G06Q 30/0209 |
| | | | 463/25 |

FOREIGN PATENT DOCUMENTS

| | | |
|---|---|---|
| JP | 2007-033586 A | 2/2007 |
| TW | 200941370 | 10/2009 |
| WO | 2013/095365 A1 | 6/2013 |

OTHER PUBLICATIONS

Extended European Search Report from related application EP11877945.3 dated Jul. 14, 2015.

Wooldridge et al., "The Business of iPhone and iPad App Development: Making and Marketing Apps That Succeed, Second Edition", Mar. 30, 2011.

Taiwan Office Action from related application TW101148371 mailed Jul. 27, 2016.

European Office Action from related application EP11877945.3 mailed Jul. 22, 2016.

Chinese Office Action issued in Chinese Application No. 201180075737.4, dated Aug. 31, 2016, with English translation, 22 pages.

Miniclip: "Miniclip Partners with In-Game Advertising Network RapidFire", 4 pages, date unknown.

http://www.rapidfire.com: "A Quick Look at the Lead Times for In-Game Advertising Campaigns", 6 pages, date unknown.

Games at Miniclip.com, 3 pages, date unknown.

Miniclip: "Custom game integrations and Advergames", 12 pages, date unknown.

Taiwanese Office Action and Search Report issued in Taiwanese Application No. 101148058, dated Feb. 10, 2017, with English translation of Search Report, 13 pages.

Chinese Office Action issued in Chinese Application No. 201180075737.4, dated Apr. 28, 2017, with English Translation, 21 pages.

* cited by examiner

SYSTEM AND METHOD FOR PROMOTING MEDIA IN AN ONLINE DISTRIBUTION PLATFORM

FIELD

The present disclosure relates to a system and method for distributing digital media, and, more particularly, to a system and method for promoting software applications in an online distribution platform.

BACKGROUND

Online distribution of media is a rapidly developing segment of the personal computing market. In particular, online distribution platforms may allow a user to access and download and/or stream digital media to an electronic device, such as a personal computer (PC), netbook, personal digital assistant (PDA), smartphone, cellular phone, etc. Examples of current online distribution platforms include, for example, Android Market offered by Google® and iTunes Store offered by Apple®. Some current distribution platforms may offer access to a variety of digital media, such as music, video, as well as software applications, also referred to as "apps".

Current online distribution platforms may be configured to allow a user to browse a catalog of digital media and download and/or stream the media of their choice to their electronic device. Distribution platforms may be referred to as "stores" where a user may "shop" for media, including apps. Distribution platforms may also be configured to provide a user with tools to aid in the browsing process. For example, some platforms include a search feature, allowing a user to find a particular app by name. Additionally, some platforms may further include sorting functions, allowing a user to sort apps based on category or genre, as well as popularity and/or price.

Although current online distribution platforms may provide users with tools to aid in the browsing process, some apps may not be easily discoverable. In particular, as the app market has developed, the distribution of apps has become increasingly competitive. For example, some app developers, such as a mom-and-pop or individual hobbyist, may not be able to promote their apps as easily as, for example, an app development company for many obvious reasons, one of which being lack of financial resources. As such, apps developed by the mom-and-pop or individual developer may not be readily discoverable by a user during the browsing process, thereby leading to less chance of the apps being distributed, i.e. purchased and downloaded.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a system and method for promoting media in an online distribution platform. The system may include one or more client devices configured to access an online distribution platform over a network, wherein the online distribution platform may provide digital media to the client devices. The online distribution platform may include an interface configured to allow a user of a client device to access a media database and download and/or stream digital media from the media database to the client device.

The interface may further be configured to allow a user to access a gaming database containing a plurality of gaming applications, wherein the user may select and play at least one of the plurality of gaming applications on the client device. The content of each gaming application may include metadata of associated digital media from the media database, such that during gameplay, the metadata may be displayed as part of the gaming content of the gaming application, thereby promoting the associated digital media to the user. Additionally, information data corresponding to the associated digital media may be provided to the user, wherein the interface may be configured to allow the user to download and/or stream the associated digital media to the client device.

A system and method consistent with the present disclosure provides a user with access to, not only a media database, wherein the user may browse and download and/or stream digital media from the media database to the user's client device, but also a gaming database, wherein the user may select a gaming application from the gaming database and play the selected gaming application on the user's client device. During gameplay, digital media, such as "apps" available in the media database, may be promoted to the user while the user is playing the selected gaming application. As such, the gaming applications are configured to not only provide entertainment to the user, but also provide information related to digital media being promoted. Additionally, the gaming applications may further provide user rewards based on user gameplay, such as a free download of a particular digital media, further motivating a user to access the distribution platform more frequently and remain engaged with the distribution platform for longer periods, thereby increasing the opportunity for apps to be discovered. In addition, a system and method consistent with the present disclosure may further provide developers with an alternative approach to promoting their media, i.e. promotion via the gaming applications.

Figure 1:
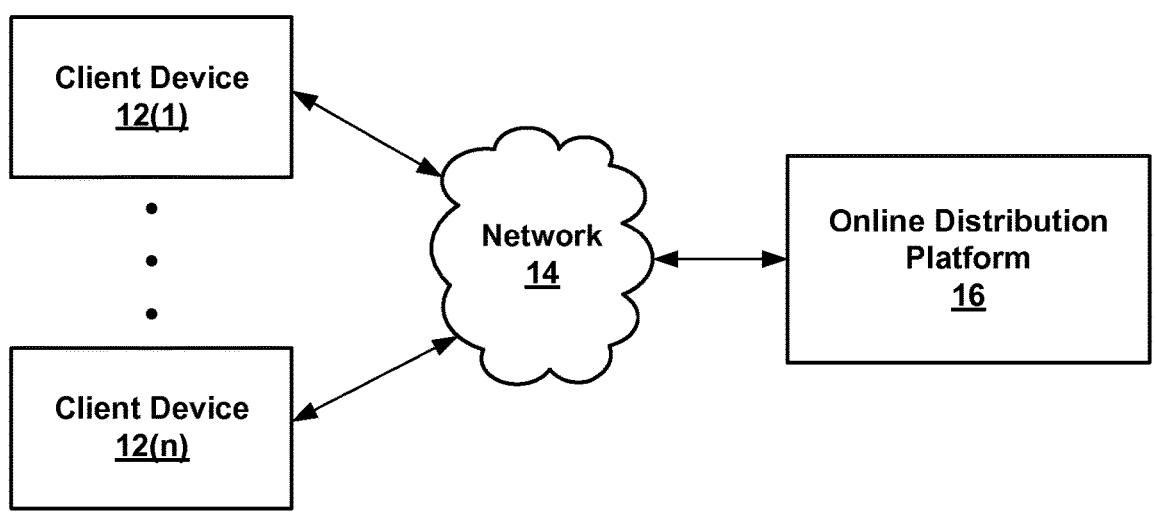
FIG. 1 is a block diagram illustrating one embodiment of a system for promoting media in an online distribution platform consistent with various embodiments of the present disclosure.

Turning to FIG. 1, one embodiment of a system 10 consistent with the present disclosure is generally illustrated. The system 10 may include one or more client devices 12(1)-12(n) (hereinafter referred to as "client device 12"), a network 14, and an online distribution platform 16. As described in greater detail herein, each client device 12 may be configured to access and communicate with the online distribution platform 16 over the network 14, wherein the distribution platform 16 may be configured to provide digital media to each client device 12.

The client device 12 may provide digital media services and/or telephony services to one or more associated end users. In particular, the client device 12 may include, but is not limited to, a personal computer (PC), netbook, tablet, smart phone, portable digital assistant (PDA), portable media player (PMP), and mobile phone. As generally understood by one skilled in the art, the client device 12 may be configured to provide playback of digital media to a user. In particular, when executed by a player of the client device 12, the selected digital media may be presented to the user aurally and/or visually on the client device 12, via speakers and/or a display, for example. The client device 12 may further include an Ethernet interface, such as a 10/100/1000 megabit per second (Mbps) Ethernet interface and/or an internal wireless network adapter, such as an 802.11 wireless network adapter, for providing network connectivity to the network 14.

Figure 2:
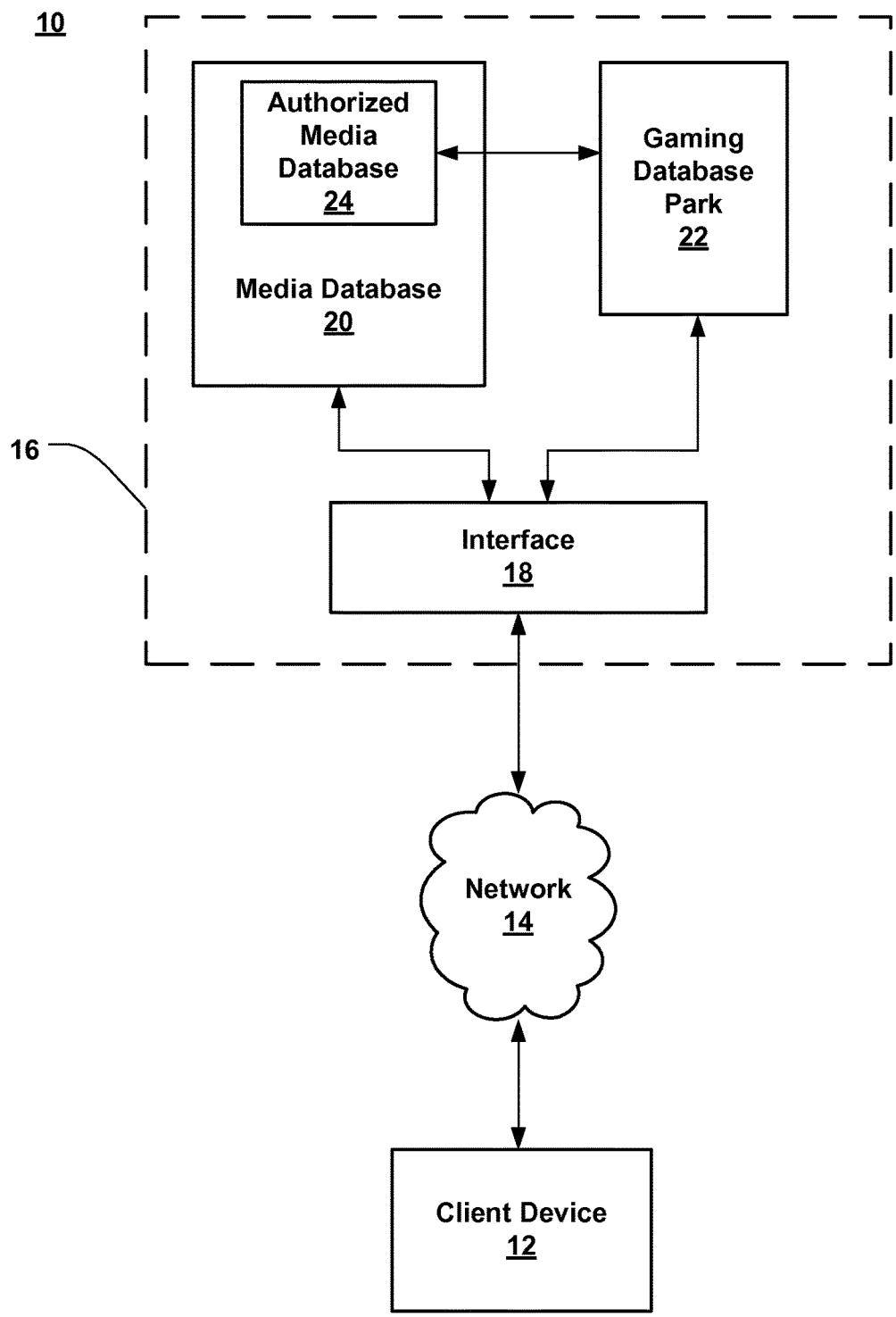
FIG. 2 is a block diagram illustrating the system of FIG. 1 in greater detail.

Turning now to FIG. 2, the system 10 of FIG. 1 is illustrated in greater detail. In the illustrated embodiment, upon accessing the online distribution platform 16 via the client device 12, an interface 18 may allow the user to access a media database 20. In particular, the interface 18 may allow a user to browse digital media files stored in the media database 20. The interface 18 may be configured to allow a user to select digital media files to download and/or stream from the online distribution platform 16 to the client device 12 over the network 14. In one embodiment, some of the digital media files may be freely downloaded and/or streamed while some of the digital media files may require purchase. The streaming of media files may include any known or contemplated methods as generally understood by one of ordinary skill in the art. The downloading of media files may include fully downloading media content to a memory of the client device 12, such as a hard drive or other form of storage media, that may allow for quick access to and execution of the media content on the client device 12.

The digital media available to a user on the online distribution platform 16 may include music files, video files, as well as software applications (hereinafter referred to as "apps"). Apps may be available in various categories, including, but not limited to, education, entertainment, finance, games, lifestyle, music & audio, photo & video, productivity, reference, social, sports, travel, and utilities. The interface 18 may provide a user with tools to aid the user in the browsing process. In one embodiment, the interface 18 may provide a search tool configured to allow a user to find a particular app by a keyword, such as an app name or the genre of the app. The interface 18 may further provide sorting functions configured to allow a user to sort apps based on category or genre, as well as popularity and/or price. In the following examples, the promotion of apps are described herein. It should be noted, however, that systems and methods consistent with the present disclosure also include the promotion of other media, such as music and/or video.

In addition to providing access to the media database 20, the interface 18 may further allow a user to access a gaming database 22, (hereinafter referred to as "park 22"). In particular, the interface 18 may allow a user to browse gaming applications stored in the park 22. The park 22 may include a variety of gaming applications from which the user may select and play on the client device 12. As described in greater detail herein, the content of a gaming application may include metadata of one or more apps stored in the media database 20. The metadata may include, for example, icons, screenshots, audio samples, and/or video samples from an associated app, and may be incorporated into the gaming content of the selected gaming application.

In one embodiment, a selected gaming application from the gaming database 22 may only include metadata of an app included in an authorized media database 24. In particular, when submitting an app to the online distribution platform 16, a developer of the app may authorize use of the app in the park 22 (i.e. authorize a selected gaming application to include metadata of the app in the content of the gaming application). By authorizing the app to be incorporated into the gaming applications of the park 22, the authorized app is stored in an authorized media database 24. Additionally, authorization of an app to be included in the park 22 may require a developer to consent to having the authorized app be accessed (i.e. purchased, downloaded, and/or streamed) for free in the event the user playing the authorized app is rewarded during gameplay. As such, in one embodiment, a gaming application may only select authorized apps from the authorized media database 24 and incorporate metadata from such authorized apps into content of the gaming application.

Figure 3A:
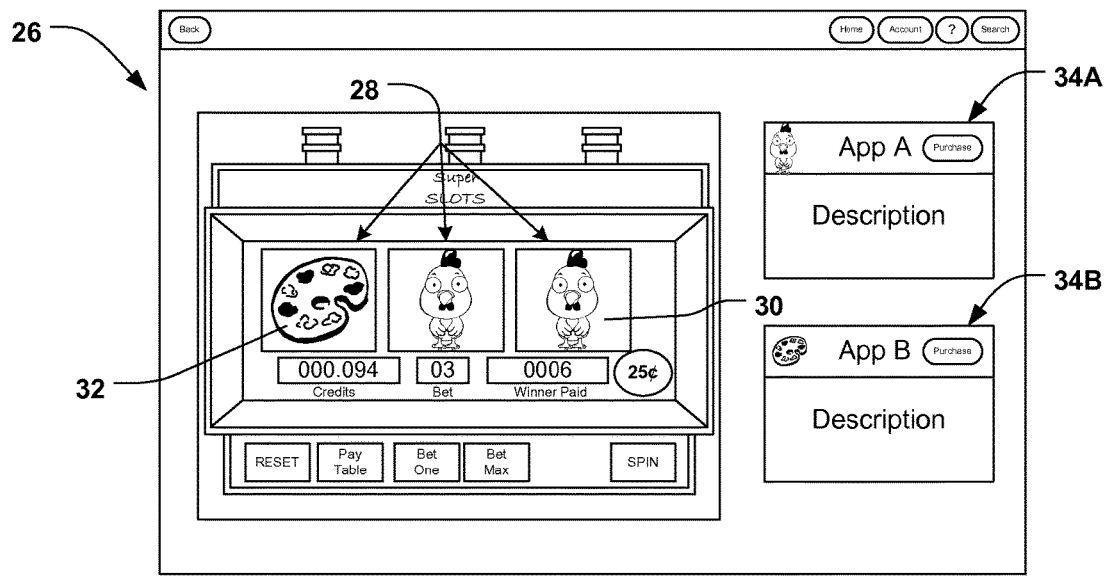
FIGS. 3A and 3B are screenshots of a gaming application as displayed on a client device.
Figure 3B:
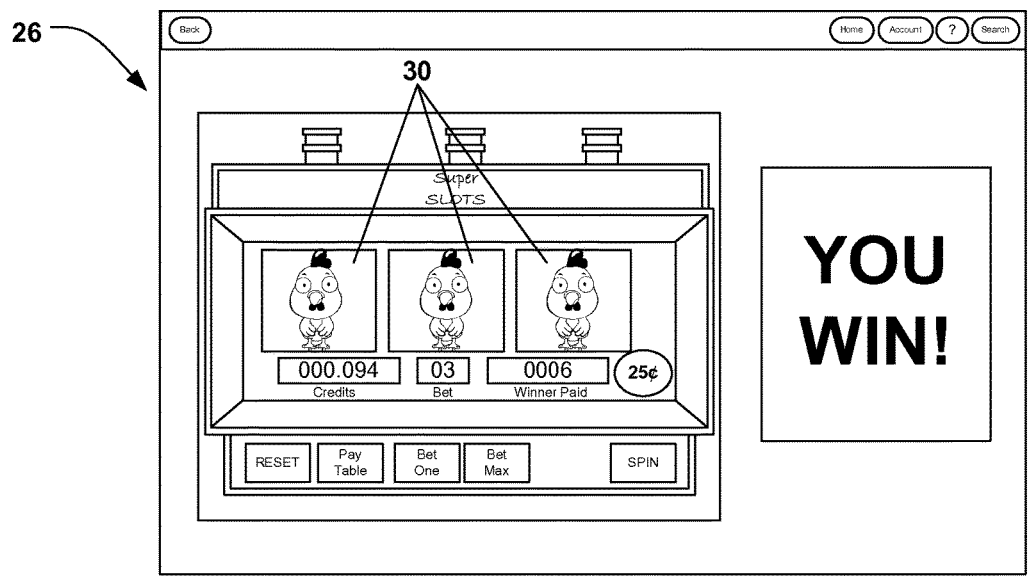

FIGS. 3A and 3B are exemplary screenshots of a gaming application 26 as displayed on a client device 12. As previously discussed, one or more apps may be promoted to the user during gameplay of a gaming application 26. In the illustrated embodiment, the gaming application 26 may include, for example, a slot machine game, wherein the content of the gaming application 26 includes metadata 28 corresponding to one or more authorized apps from the authorized media database 24. In the current example, as the wheels randomly spin during gameplay, each wheel may include one or more icons from one or more corresponding authorized apps. As shown, the gaming application 26 incorporates icons 30, 32 corresponding to apps A, B, respectively, into the content of the gaming application 26 (i.e. the wheels of the slot machine include icons 30, 32). Additionally, informational data corresponding to the metadata 28 may be displayed to the user. As shown, information 34A, 34B related to apps A, B, respectively, is provided when icons 30, 32 are displayed. The information 34A, 34B may include further details related to the apps A, B. The details may include, for example, the name, price, and/or brief description of the associated app. The interface 18 may further allow a user to select, purchase and download and/or stream an app being promoted in the gaming application 26.

In addition to promoting apps, the gaming application 26 may be configured to provide a user with rewards based on gameplay. As shown in FIG. 3B, for example, a user may be rewarded if the user attains a certain score or combination depending on the particular gaming application 26. For example, in the current example of a slot machine gaming application, in the event that the icons on all wheels of the slot machine match (all wheels display icon 30 as shown in FIG. 3B), the user wins a reward. In one embodiment, a user may be rewarded with a free download of an app. Additionally or alternatively, a user may be rewarded with points that the user may save to a user account and later spend on future app purchases.

Figure 4:
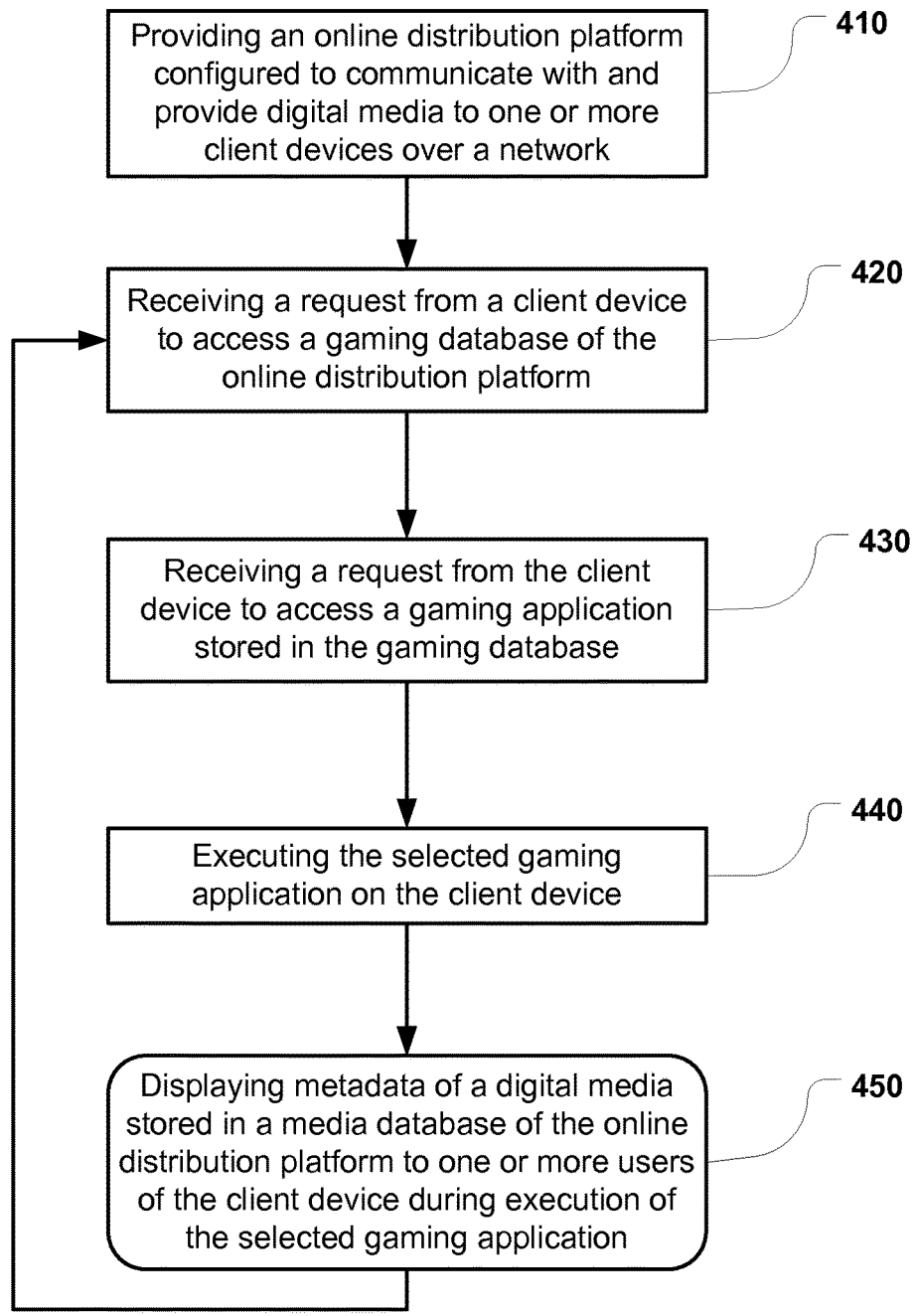
FIG. 4 is a flow diagram illustrating one embodiment for promoting media in an online distribution platform consistent with various embodiments of the present disclosure.

Turning now to FIG. 4, a flowchart of one embodiment of a method 400 for promoting media in an online distribution platform is illustrated. The method 400 includes providing an online distribution platform configured to communicate with and provide digital media to one or more client devices over a network (operation 410). In particular, the online distribution platform may include a media database and/or a gaming database. The media database may include digital media, including, but not limited to, audio files, such as music, video files, such as movies, and software applications (commonly referred to as "apps"). The online distribution platform may be accessed by one or more client devices over a network. In one embodiment, the client device may include a netbook. In other embodiments, the client device may include, but is not limited to, a personal computer (PC), tablet, smart phone, portable digital assistant (PDA), portable media player, and mobile phone. In the following examples, the client device will hereinafter be referred to as a netbook.

The method 400 further includes receiving a request from a client device to access a gaming database of the online distribution platform (operation 420). Upon accessing the online distribution platform with a netbook over the network, the user may access the media database and/or gaming database. In one example, the user may wish to access the gaming database. In this instance, an interface may receive a request from the user via the netbook to access the gaming database. The method 400 further includes receiving a request from the client device to access a gaming application stored in the gaming database (operation 430). Upon accessing the gaming database, the user may browse and select one of a plurality of games to play on their netbook. The method 400 further includes executing the selected gaming application on the client device (operation 440). Upon a user selecting a gaming application to play, the selected gaming application is executed on the user's netbook. In one embodiment, the game may be streamed to the user's netbook, as generally understood by one skilled in the art. In other embodiments, the game may be downloaded and stored on the netbook.

The method 400 further includes displaying metadata of a digital media stored in the media database of the online distribution platform to one or more users of the client device during execution of the selected gaming application (operation 450). In particular, metadata relating to one or more apps offered in the media database is incorporated into the gaming content of each of the gaming applications. The metadata may include, for example, icons, screenshots, and/or sound effects from an associated app. During execution, i.e. gameplay, of the selected gaming application, the metadata of one or more apps may be visually and/or aurally presented to the user, thereby promoting the one or more apps to the user. Additionally, details associated with the one or more apps being promoted may be presented to the user. The details may include information regarding the apps being promoted, including, but not limited to, the name, description, price, and popularity. The interface may be configured to further allow the user to select and download and/or stream the apps being promoted to their netbook. As previously discussed, the apps to be promoted via the gaming applications may be selected from the media database. In particular, the apps may be selected from an authorized media database which includes apps that have been authorized by a developer to be incorporated into the gaming database and promoted via the gaming applications.

It should be noted that in addition to accessing the gaming database, the user may wish to browse a catalog of apps stored in the media database. In this instance, the interface may receive a request from the user via the netbook to access the media database, wherein, upon accessing the media database, the user may browse and download and/or stream the app of their choice to their netbook.

While FIG. 4 illustrates method operations according various embodiments, it is to be understood that in any embodiment not all of these operations are necessary. Indeed, it is fully contemplated herein that in other embodiments of the present disclosure, the operations depicted in FIG. 4 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

A system and method consistent with the present disclosure provides an online distribution platform including an interface that not only allows a user to browse media according to conventional methods, as discussed above, but also allows a user to access gaming applications, wherein media may be promoted to the user while the user is actively engaging a gaming application. The gaming applications may be configured to not only provide entertainment to the user, but also provide information related to media that may be of interest to the user. The gaming applications may further provide user rewards based on user gameplay, further motivating a user to access the distribution platform more frequently, as well as remain engaged with the distribution platform for longer periods, thereby increasing the opportunity for apps to be discovered.

In addition, a system and method consistent with the present disclosure may further provide developers with an alternative approach to promoting their media. As previously discussed, some developers, (e.g. individual developers, such as garage developers and/or technical hobbyists) may not have the financial wherewithal to market their apps. A system and method consistent with the present disclosure may provide developers with a reduced competition environment in which their apps may have an increased chance of discovery by the user, thereby leading to an increase in distribution (i.e. purchase) of the app. In particular, Consistent with one embodiment of the present disclosure, there is provided a system. The system includes one or more client devices and an online distribution platform configured to communicate with and provide digital media to the one or more client devices over a network. The online distribution platform includes an interface configured to allow the one or more client devices to access a media database and a gaming database of the distribution platform. The interface is configured to allow a user of a client device to browse and select one of a plurality of gaming applications stored in the gaming database to execute on the client device. Content of the selected gaming application includes metadata of a digital media file to be promoted stored in the media database. The metadata is displayed to the user of the client device during execution of the selected gaming application on the client device.

Consistent with another embodiment of the present disclosure, there is provided a method for promoting media in an online distribution platform. The method includes providing an online distribution platform configured to communicate with one or more client devices over a network. The online distribution platform includes an interface configured to allow the one or more client devices to access a media database and a gaming database of the distribution platform. The method further includes receiving, by the interface, a request from a client device to access the gaming database. The interface is configured to allow a user of the client device to browse and select one of a plurality of gaming applications stored in the gaming database to execute on the client device. The method further includes receiving, by the interface, a request from the client device to access and execute a selected one of the plurality of gaming applications on the client device. Content of the selected gaming application comprises metadata of a digital media file to be promoted stored in the media database. The method further includes displaying the metadata to the user of the client device during execution of the selected gaming application on the client device.

Consistent with yet another embodiment of the present disclosure, there is provided a tangible computer-readable medium including instructions stored thereon. When executed by one or more processors, the instructions may cause a computer system to perform operations including providing an online distribution platform configured to communicate with one or more client devices over a network. The online distribution platform includes an interface configured to allow the one or more client devices to access a media database and a gaming database of the distribution platform. The operations further include receiving, by the interface, a request from a client device to access the gaming database. The interface is configured to allow a user of the client device to browse and select one of a plurality of gaming applications stored in the gaming database to execute on the client device. The operations further include receiving, by the interface, a request from the client device to access and execute a selected one of the plurality of gaming applications on the client device. Content of the selected gaming application comprises metadata of a digital media file to be promoted stored in the media database. The operations further include displaying the metadata to the user of the client device during execution of the selected gaming application on the client device.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

As used in any embodiment herein, the term "module" refers to software, firmware and/or circuitry configured to perform the stated operations. The software may be embodied as a software package, code and/or instruction set or instructions, and "circuitry", as used in any embodiment herein, may comprise, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), etc.

Certain embodiments described herein may be provided as a tangible machine-readable medium storing computer-executable instructions that, if executed by the computer, cause the computer to perform the methods and/or operations described herein. The tangible computer-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

What is claimed is:

1. An online distribution platform to communicate with and provide digital media content to one or more client devices over a network, the online distribution platform comprising:
   an interface to allow the one or more client devices to access the online distribution platform;
   a media database that includes a promoted application and metadata associated with the promoted application; and
   a gaming database that includes a gaming application;
      wherein the promoted application is a different application than the gaming application;
   wherein the interface to enable a user of a client device to browse and select the gaming application stored in the gaming database, and to enable the user to play the gaming application;
      wherein the online distribution platform is to:
      receive authorization, from a developer of the promoted application, to incorporate the metadata into the gaming application;
      incorporate the metadata into the gaming application;
      display the metadata to the user of the client device during play of the gaming application; and
      enable the user to receive the promoted application.

2. The online distribution platform of claim 1 wherein the online distribution platform communicates the gaming application from the gaming database to the client device over the network.

3. The online distribution platform of claim 2 wherein the online distribution platform streams the gaming application to the client device.

4. The online distribution platform of claim 2 wherein the online distribution platform downloads the gaming application to a memory of the client device.

5. The online distribution platform of claim 1 wherein the metadata is selected from the group consisting of icons, screenshots, audio samples, and video samples of the promoted application.

6. The online distribution platform of claim 1 wherein the media database includes an authorized media database that contains a digital media file being promoted and corresponding metadata, the digital media file being promoted being authorized to have corresponding metadata incorporated into the gaming application and displayed to the user during play of the gaming application.

7. The online distribution platform of claim 1 wherein the one or more client devices is selected from the group consisting of a personal computer (PC), netbook, tablet, smart phone, portable media player (PMP), portable digital assistant (PDA), and mobile phone.

8. A method to cause a processor in an online distribution platform to promote media, the method comprising:
coupling the processor in the online distribution platform to one or more client devices via a network;
receiving, by the processor in the online distribution platform via an interface on a client device, a request to access a gaming database coupled to the online distribution platform;
receiving, from the client device by the processor in the online distribution platform, a selection of a gaming application stored in the gaming database;
receiving, from the client device by the processor in the online distribution platform, a request to execute the gaming application;
receiving authorization, by the processor in the online distribution platform from a developer of a promoted application, to incorporate metadata into the gaming application;
wherein:
the promoted application is a different application than the gaming application;
the metadata is associated with the promoted application; and
the promoted application is stored in a media database coupled to the processor in the online distribution platform;
incorporating, by the processor in the online distribution platform upon receipt of the authorization, the metadata into the gaming application;
displaying the metadata to the user of the client device during play of the gaming application; and
enable the user to receive the promoted application.

9. The method of claim 8 wherein the processor in the online distribution platform is to stream the gaming application to the client device.

10. The method of claim 8 wherein the processor in the online distribution platform is to provide the gaming application to the client device for download to a memory of the client device.

11. The method of claim 8 wherein the metadata is selected from the group consisting of icons, screenshots, audio samples, and video samples of the promoted application.

12. The method of claim 8 further comprising:
causing a display of informational data corresponding to the promoted application to the user of the client device during play of the gaming application.

13. The method of claim 12 wherein the informational data is selected by the processor in the online distribution platform from the group consisting of the name, price, and description of the promoted application.

14. The method of claim 8 wherein the processor in the online distribution platform is to provide the promoted application from the media database to the client device over the network.

15. The method of claim 8 wherein the promoted application and corresponding metadata is stored in an authorized media database of the online distribution platform, the promoted application being authorized to have corresponding metadata incorporated into the gaming application and displayed to the user during play of the gaming application.

16. A non-transitory tangible computer-readable medium including instructions stored thereon which, when executed by one or more processors, cause a computer system to perform operations comprising:
couple an online distribution platform to one or more client devices via a network;
receive, by the online distribution platform via an interface on the client device, a request to access a gaming database coupled to the online distribution platform;
receive, from the client device by the online distribution platform, a selection of a gaming application stored in the gaming database;
receive, from the client device by the online distribution platform, a request to execute the gaming application;
receive authorization, by the online distribution platform from a developer of a promoted application, to incorporate metadata into the gaming application, wherein:
the promoted application is a different application than the gaming application;
the metadata is associated with the promoted application; and
the promoted application is stored in a media database coupled to the online distribution platform;
incorporate, by the online distribution platform upon receipt of the authorization, the metadata into the gaming application;
display the metadata to the user of the client device during play of the gaming application; and
enable the user to receive the promoted application.

* * * * *